Sept. 2, 1969    O. M. SCOTT    3,464,143
SNELLED FISHHOOK RECEPTACLE
Filed April 9, 1968    2 Sheets-Sheet 1
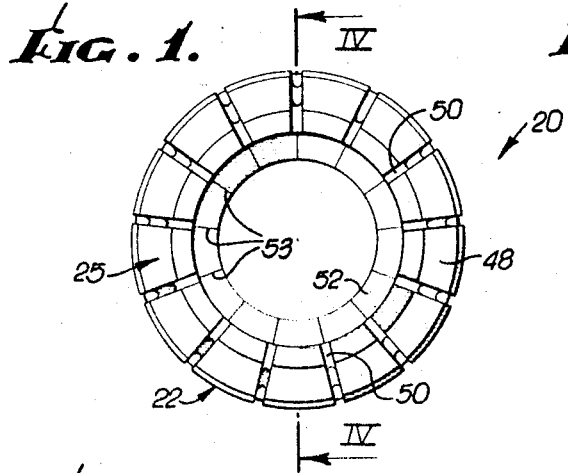
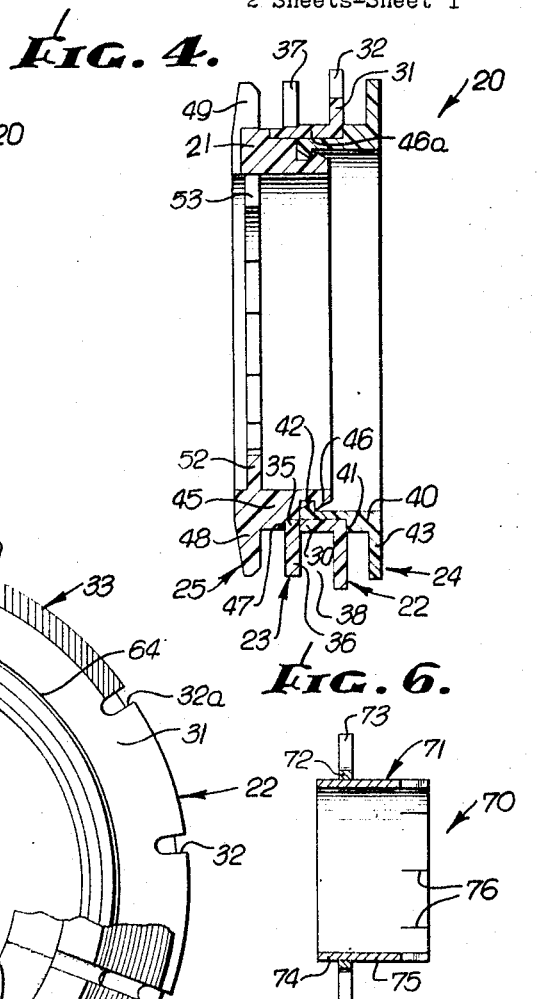
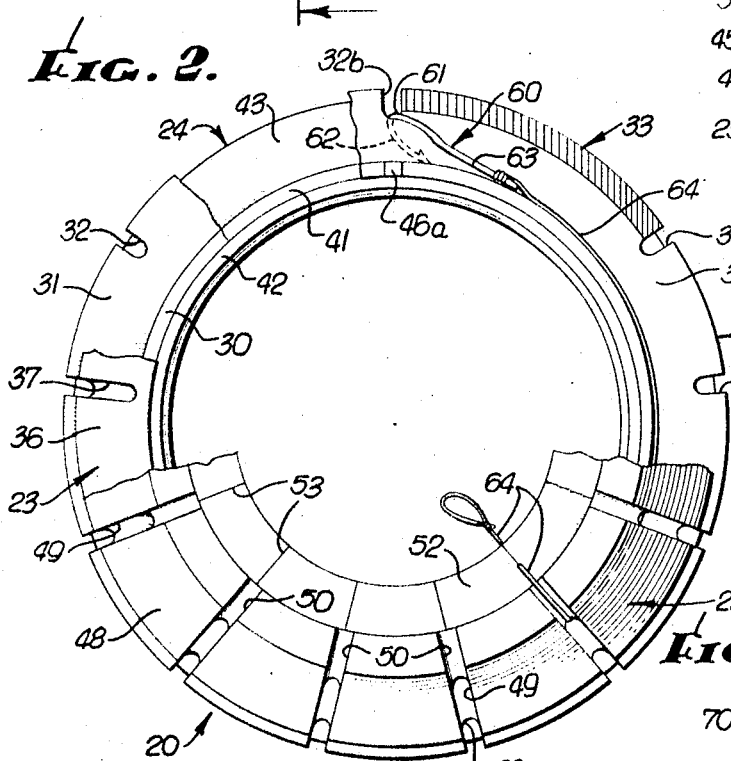
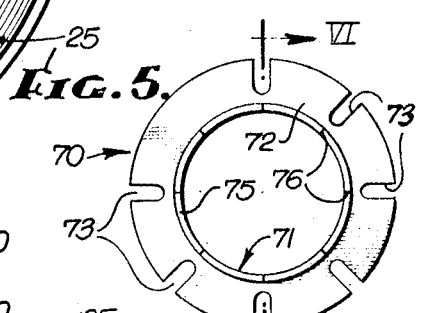
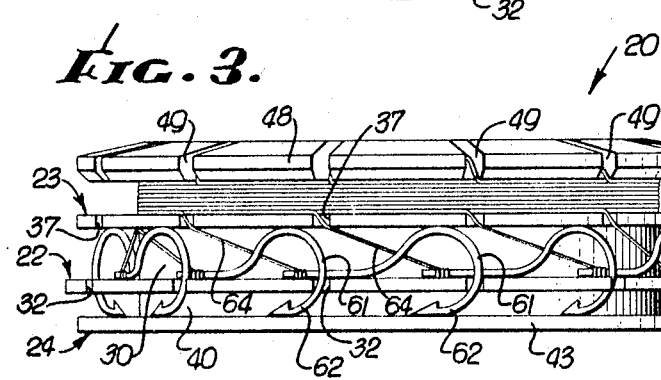
INVENTOR.
OZBERT M. SCOTT
BY Lyon & Lyon
ATTORNEYS.

Sept. 2, 1969   O. M. SCOTT   3,464,143
SNELLED FISHHOOK RECEPTACLE
Filed April 9, 1968   2 Sheets-Sheet 2
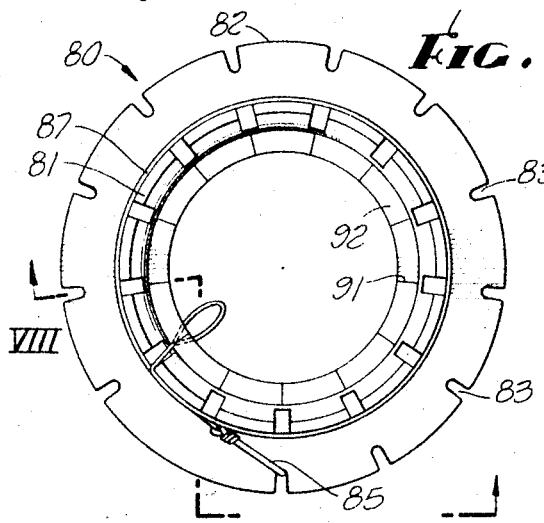
FIG. 7.
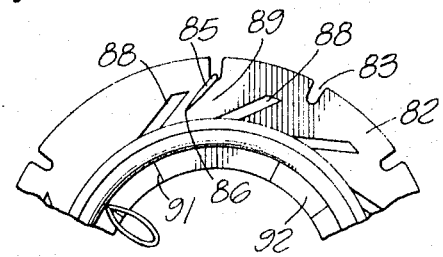
FIG. 9.
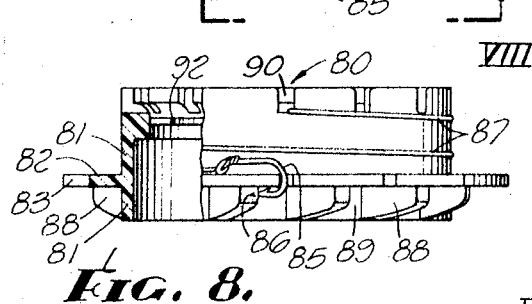
FIG. 8.
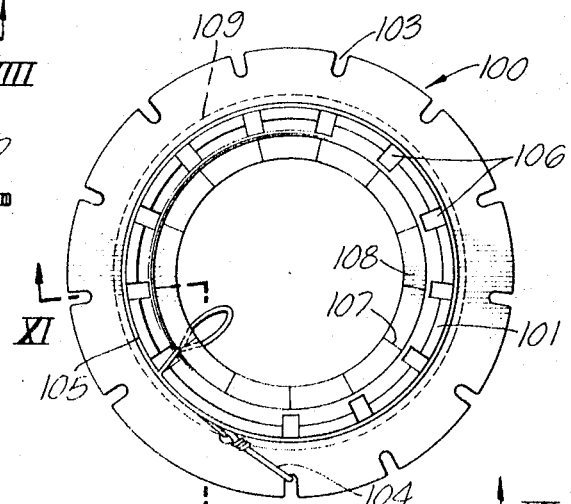
FIG. 10.
FIG. 11.
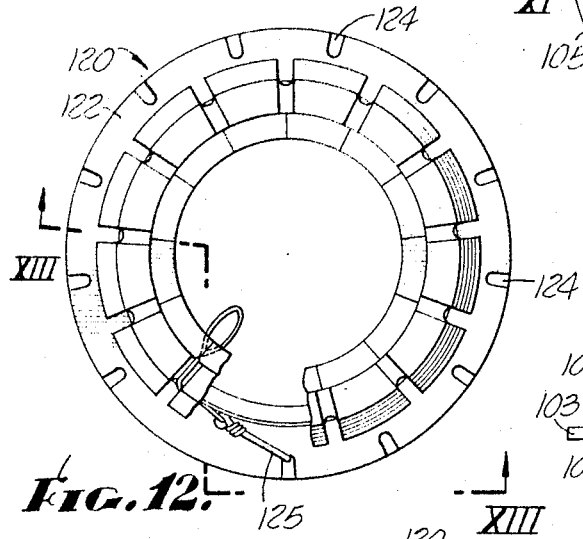
FIG. 12.
FIG. 13.
INVENTOR
OZBERT M. SCOTT
BY
Lyon & Lyon
ATTORNEYS United States Patent Office 3,464,143
Patented Sept. 2, 1969

3,464,143
SNELLED FISHHOOK RECEPTACLE
Ozbert M. Scott, Montrose, Calif. 91020
Filed Apr. 9, 1968, Ser. No. 719,921
Int. Cl. A01k 97/06
U.S. Cl. 43—57.5                                11 Claims

ABSTRACT OF THE DISCLOSURE

A receptacle for holding a plurality of snelled fishhooks includes a cylindrical body portion and at least one radially outwardly extending flange which has circumferentially spaced notches therein for receiving and holding fishhooks, so that the leader attached to each may be wound around the cylindrical body portion. A separate anchor secures the free end of each leader.

---

The problem of carrying fishhooks with attached leaders while fishing has long been a vexing problem for fishermen because of the tendency of the hooks and leaders to become tangled or fouled in the fisherman's tackle box or clothing. This problem is created by the desire to have a plurality of preferred sized hooks with attached leaders readily available when fishing for a specific type of fish. Thus, sportsmen usually prepare their hooks and leaders during leisure hours at home, rather than while they are engaged in fishing.

Various devices are known in the prior art for carrying a plurality of snelled fishhooks and which attempt to prevent tangling or snagging of such fishhooks and leaders when not in use. However, such devices are generally complicated, bulky, expensive or otherwise undesirable and none appear to satisfactorily carry multi-barbed hooks.

In general, the present invention provides a receptacle for a plurality of snelled fishhooks, having a cylindrical body, at least one radially outwardly extending flange with notches receiving and holding a hook with the point and barb protectively disposed interiorly of the outer circumferential edge of the flange. The leader is wound around the body and the free end of the leader is secured by suitable means. Successive snelled hooks are secured to the receptacle and indexing means is provided so that the last snelled hook can be located and is the first to be removed. In this manner the snelled hooks may be carried without tangling or snarling with other fishing gear or clothes, or with one another, and can be easily removed for use.

Accordingly, it is a general object of the present invention to provide a snelled fishhook receptacle that avoids all of the disadvantages of devices and expediencies used heretofore for this purpose.

An object of the present invention is to provide a snagproof and tangleproof receptacle for a plurality of snelled fishhooks wherein the points and barbs of the fishhooks do not project externally from the receptacle and the leaders are confined and held so as not to become entangled with one another or with the fishhooks, and the device is compact and can be carried in the pocket.

It is another object of the present invention to provide a snarlproof snelled fishhook receptacle of the above-described type wherein the free ends of the leaders are releasably held so that the entire snelled fishhook is releasably secured to the receptacle.

It is a further object of the present invention to provide a snelled fishhook receptacle of the above-described type wherein a plurality of fishhooks and attached leaders may be carried by the receptacle by sequentially securing each of the fishhooks and attached leaders to the receptacle, in reference to indexing means, so that the snelled fishhook which is the last to be secured to the receptacle may be easily identified and will be the first snelled fishhook to be unsecured from the receptacle and ready for use.

Other objects and advantages of this invention will be readily apparent from the following description when considered in connection with the appended drawing.

In the drawings:

FIG. 1 is a top plan view of an exemplary embodiment of a receptacle constructed in accordance with the present invention;

FIG. 2 is a top plan view of the embodiment shown in FIG. 1 with portions thereof shown broken away;

FIG. 3 is a side elevation view of the receptacle shown in FIGS. 1 and 2 illustrating a plurality of snelled fishhooks secured thereto;

FIG. 4 is a side sectional view of the receptacle taken along the line IV—IV of FIG. 1;

FIG. 5 is a top plan view of an alternate embodiment of a receptacle constructed in accordance with the present invention;

FIG. 6 is a side sectional view of the receptacle shown in FIG. 5 taken along the line VI—VI;

FIG. 7 is a top plan view showing another modification;

FIG. 8 is a sectional elevation taken substantially on the lines VIII—VIII as shown on FIG. 7;

FIG. 9 is a bottom plan view partly broken away;

FIG. 10 is a top plan view of another modification;

FIG. 11 is a sectional elevation taken substantially on the lines XI—XI as shown on FIG. 10;

FIG. 12 is a top plan view of a further modification;

FIG. 13 is a side elevation taken substantially on the lines XIII—XIII as shown in FIG. 12.

Referring now to FIGS. 1 through 4, there is shown one exemplary embodiment of a snelled fishhook receptacle constructed in accordance with the present invention and generally indicated by the reference numeral 20. Receptacle 20 comprises a cylindrical body portion, generally indicated at 21, and includes a plurality of interfitted body elements 22, 23, 24 and 25. The entire receptacle 20 is preferably constructed of plastic and it will be apparent that rather than construction with a plurality of separate body elements the entire receptacle may be formed, by molding or the like, as an integral unitary piece.

Element 22 includes a hub portion 30 and a hook receiving radially outwardly extending flange 31 provided with a plurality of circumferentially spaced notches indicated at 32. The hook receiving flange 31 is also provided with indexing means 33 comprising a visual index mark, illustrated in FIG. 2 as a red colored arcuate mark (it being understood that any contrasting color is useable). Indexing means 33 may also include the provision of one less notch on flange 31 than on the adjacent flange so that the index may be tactilely located, and thereby facilitate location of the index means.

Intermediate elements 23 and 24 are disposed externally on opposite sides of hook receiving flange 31. Element 23 comprises a hub portion 35 and a radially outwardly extending second flange 36 which is provided with a plurality of circumferentially spaced notches, indicated at 37. The flanges 31 and 36 define an annular channel 38 therebetween for receiving the shank of a fishhook, as seen best in FIG. 3.

Element 24 includes a hub portion 40 having a shoulder 41 for receiving hub portion 30 of element 22. Hub portion 40 of element 24 also includes an inwardly directed circumferential lip 42 on the upper edge thereof. A third radially outwardly extending flange 43 extends from hub 40 of element 24. It will be seen that third flange 43 does not include any circumferentially spaced notches as do flanges 31 and 36. Flange 43 together with flange 31 forms an annular channel 44 for receiving the barb portion of the fishhooks, as seen best in FIG. 3.

The exemplary embodiment of receptacle 20 includes a fourth element 25 having a hub portion 45 with a downwardly depending portion and a radially outwardly extending circumferential lip 46. Hub portion 45 also includes a shoulder indicated at 47 for receiving the hub portion 35 of element 23. As seen best in FIG. 4, lip 42 of element 24 engages lip 46 of element 25 when the receptacle 20 is assembled so as to secure hub portions 30 and 35 of elements 22 and 23, respectively, between shoulders 47 and 41 of elements 25 and 24, respectively. The engagement of lips 42 and 46 is accomplished by a snap fit and rendered non-rotatable by the provision of the dogs and cooperating openings, indicated at 46a on hub portions 30, 35 and 45.

Element 25 also includes a fourth radially outwardly extending flange 48 having a plurality of circumferentially spaced notches 49 extending radially inwardly from the outer circumferential edge of flange 48 to a depth which is susbtantially equal to the depth of notches 37 in flange 36 of element 23. Radially aligned with notches 49 in fourth flange 48 is a plurality of circumferentially spaced grooves 50 which are superimposed above notches 49 and extend radially inwardly through hub portion 45 of element 25. Fourth flange 48 of element 25 forms an annular channel 51 with flange 36 of element 23 for receiving the fishhook leaders as may be seen most clearly in FIG. 3.

Hub portions 45 of element 25 also carries means for receiving and holding the free end of fishhook leaders which, in the exemplary embodiment, comprises a radially, inward directed, thin circular flange 52 which includes a plurality of radial slits 53 radially aligned with notches 49 and grooves 50 in element 25. Flange 52 is preferably resilient and consequently element 25 may be formed of a resilient plastic.

It will now be seen that when receptacle 20 is assembled there is provided a cylindrical body portion 21, four radially outwardly extending flanges 31, 36, 43 and 48, and a radially inwardly extending flange 52. Moreover, the radially outwardly extending flanges define three annular channels 38, 44 and 51. The purpose of the details of the above-described structural configuration of receptacle 20 may be best explained in reference to its use for securing snelled hooks thereon. In this regard particular attention is drawn to FIGS. 2 and 3. A first hook is releasably secured on receptable 20 by visually or tactilely locating the index means 33. This first hook is received in notch 32a of hook receiving flange 31 and each successive hook and attached leader is secured to receptacle 20 by proceeding clockwise around the receptacle. The final hook, indicated at 60, is secured to the receptacle by inserting the bend portion 61 into the last clockwise notch, i.e., notch 32b immediately to the left of index means 33, so that barb portion 62 is disposed within annular channel 44 and the shank portion 63 is disposed within annular channel 38, as seen best in FIG. 3. It will be seen from FIG. 2, that the entire hook 60 is enclosed within the annular grooves or channels 38 and 44 and does not project externally from the outer circumferential edge of receptacle 20. This prevents the barbs of all of the hooks from becoming entangled with clothing or other gear and also protects the fisherman from injury.

The leader 64 of hook 60 is wound around the hub 30 of element 22 within channel 38, preferably, only as far as the next adjacent notch 37 in flange 36. The leader 64 is then passed through the notch so that the free and may thereafter be wound around hub 45 within annular channel 51 until only a short portion of the free end of the leader remains. This short portion of the free end of leader 64 is then passed through one of the notches 49 in fourth flange 48 and is directed radially inwardly so as to lie in the groove 50 of fourth flange 48 and extend into the open central portion of receptacle 20. The free end of leader 64 is then forcibly inserted into one of the slits 53 in flange 52 and is frictionally secured thereby.

Since each successive hook and attached leader secured to receptacle 20 has been disposed in the next adjacent clockwise notch beginning with notch 32a in flange 31 it will be apparent that each leader is successively wound on top of the preceding leader and that leader 64 of the final hook 60 will be wound in channel 51 on top of the previously wound leaders.

To remove a snelled hook from receptacle 20 the indexing means will again be located and the last hook (moving clockwise from the index means, i.e., the first hook moving counterclockwise from the index means) and attached leader to be secured to receptacle 20 will be first removed. To remove the last hook 60 and attached leader 64, a relatively sharp object such as the blade of a penknife or a pencil will be engaged with the bend portion 61 enabling the hook 60 to be manually pulled outwardly. It will of course be appreciated, that while each hook and attached leader is wound relatively tightly upon receptacle 20, the material from which leaders are made is usually somewhat resilient so that little force is required to remove the last hook 60 from the notch 32b. With the hook 60 now free, its attached leader 64 may be easily unwound from annular channel 51, without interference from the other leaders previously wound within channel 51, until only the free end portion of the leader will be retained in one of the slits 53 in flange 52. This free end of the leader will then be forcibly disengaged from slit 53 so that the leader and attached hook is entirely released from receptacle 20 and ready for use.

It should be understood that while the specific embodiment of receptacle 20, described above, includes four external flanges, the receptacle 20 may also be constructed of a body portion with only three external flanges. In such configuration, it will be seen that the leader attached to each hook secured to the receptacle will be wound around the cylindrical body portion of the receptacle in the same annular channel in which the shank of the hook is disposed. For example, the flange 36 could be removed from the embodiment shown in FIGS. 1 through 4, and the leader disposed in annular channel 38. It will also be appreciated that while the free end of each of the leaders is secured by means of an internal flange 52 and a plurality of slits 53, in the exemplary embodiment, other means for securing the free end of the leaders could be provided on receptacle 20.

Referring now to FIGS. 5 and 6, there is shown an alternate simplified embodiment of the present invention comprising a receptacle generally indicated by the reference numeral 70. Receptacle 70 includes a cylindrical body portion 71 having a single radially outwardly extending flange 72 provided with a plurality of circumferentially spaced notches 73. Flange 72 comprises a hook receiving flange and, as will be seen by reference to FIG. 5, there is provided tactile indexing means by eliminating one of the equally circumferentially spaced notches 73. It will also be seen that cylindrical body portion 71 extends on both sides of flange 72 so that one end 74 of cylindrical body portion 71 forms a recess with flange 72 in which the sharp ends of the hooks may be disposed and thereby protected. The other end 75 of cylindrical body portion 71 includes a plurality of axial slits 76 for receiving the free end portion of the leaders attached to the hooks after such leaders are wound around cylindrical body portion 71 thereby securing the leaders and attached hooks to receptacle 70. This embodiment may also include an inwardly disposed flange, if desired, such as flange 52 on receptacle 20, for securing the loose end of the leaders.

The steps in securing and releasing hooks and attached leaders from receptacle 70 are substantially similar to those described for receptacle 20, although considerably simplified.

It will be apparent that while the above-described exemplary embodiments of the present invention include a specific number of notches in the flange or flanges, any number of notches may be provided in the receptacle. It will also be understood that the term "notches" is used herein as including cutouts or recesses or similar openings or catchments so as to define a castellated periphery of the flange. It may also be noted, with respect to the exemplary embodiment of receptacle 20, that the notches in the several flanges are in radial alignment; however, such alignment is not required.

In the embodiment of the invention shown in FIGS. 7, 8 and 9, the receptacle 80 has a cylindrical body portion 81 and a flange 82 which extends radially outwardly therefrom. Circumferentially spaced peripheral notches 83 are provided in the flange 82. Each of the notches 83 is adapted to receive the curved portion 84 of the fishhook 85, with the fishhook point 86 on one side of the flange 82, and the shank and leader 87 on the other side of the flange. Angularly directed ribs 88 on the receptacle are spaced in a circumferential series, and each connects the cylindrical portion 81 of the body with the flange 82. Pockets 89 are thus formed between adjacent ribs 88, and the point 86 and adjacent barb of the fishhook 85 extends into the pocket and is protected against snagging by the walls of the pocket. The ribs 88 are so positioned with respect to the notches 83 that the points 86 and adjacent barbs of the fishhooks 85 lie closely adjacent a generally parallel rib 88. Tactile indexing means is provided by eliminating one of the equally spaced notches 83 and one of the ribs 88. Each leader 87 is wound on the outer surface of the cylindrical portion 81 of the body and then passes through one of the notches 90 and is secured near its end by frictional engagement in one of the slits 91 in the onwardly directed flange 92.

In that form of the invention shown in FIGS. 10 and 11, the receptacle 100 is provided with a cylindrical body portion 101 having a flange 102 projecting radially outwardly therefrom, and peripheral notches 103 are provided in the flange. The fishhooks 104 are received in these notches 103 as previously described, and the leaders 105 are wrapped around the outer surface of the cylindrical body portion 101, project through the notches 106 and are secured by passing through slits 107 in the inwardly directed flange 108. An elastomeric ring 109 is mounted on the cylindrical body portion 101 adjacent the flange 102, in position to receive the points 107 of the fishhooks 104. The extreme tip end of the point 107 of each fishhook 104 may project into the elastomeric ring 109 for a short distance. The sharp points of the fishhooks are thus protected.

The form of the invention shown in FIGS. 12 and 13 is similar to that shown in FIGS. 10 and 11, except that the elastomeric ring 109 is omitted, and instead a second flange 123 is mounted on a cylindrical body portion 121. The flange 122 carries the peripheral notches 124 for reception of the fishhooks 125, and the flanges 122 and 123 define an annular groove between them for reception of the points and barbs of the fishhooks 125. The points and barbs are thus protected against fouling or entanglement.

Having fully described my invention, it is to be understood that I am not to be limited to the details herein set forth.

I claim:

1. A receptacle for a plurality of fishhooks each with an attached leader, comprising: a body having a cylindrical portion and an outwardly extending flange intermediate the ends of said cylindrical portion, said flange being provided with a plurality of circumferentially spaced peripheral notches, each of said notches being sized to receive the curved portion of a fishhook with the fishhook point on one side of the flange and the fishhook shank and its leader on the other side of the flange, so that each of the attached leaders may be wound around said cylindrical portion, and securing means carried on the body for separately receiving and holding a free end portion of each of said leaders.

2. The receptacle of claim 1 wherein the securing means comprises a radially inwardly extending flange having a plurality of circumferentially spaced slits.

3. The receptacle of claim 1 wherein the securing means comprises a plurality of circumferentially spaced slits formed on one end of the cylindrical portion of said body.

4. A receptacle for a plurality of fishhooks each with an attached leader, comprising: a body having a cylindrical portion and an outwardly extending flange, the cylindrical portion extending on both sides of said flange, said flange being provided with a plurality of circumferentially spaced peripheral notches, each of said notches being sized to receive the curved portion of a fishhook with a fishhook point on one side of the flange and the fishhook shank and its leader on the other side of the flange, so that each of the attached leaders may be wound around said cylindrical portion, and the body having another flange provided with slits for receiving and holding a free end portion of each of said leaders.

5. The receptacle of claim 4 in which the last-named flange extends inwardly from the cylindrical portion and is provided with circumferentially spaced slits for frictional reception of the leaders.

6. The receptacle of claim 4 comprising additional outwardly extending flanges on the body disposed on opposite sides of said notched flange so as to form two annular channels, one of said channels being adapted to receive the points of the fishhooks held in said notched flange, and the other of said channels being adapted to receive the shanks of the fishhooks and attached leaders.

7. The receptacle of claim 4 wherein there is provided an additional radially outwardly extending flange having circumferentially spaced slots, so that each of the attached leaders may pass through one of the last-named slots and thereafter be wound around said cylindrical portion.

8. A receptacle for a plurality of fishhooks each with an attached leader, comprising: a body having a cylindrical portion and an outwardly extending flange, the cylindrical portion extending on both sides of said flange, said flange being provided with a plurality of circumferentially spaced peripheral notches, each of said notches being sized to receive the curved portion of a fishhook with the fishhook point on a first side of the flange and its leader on a second side of the flange, so that each of the attached leaders may be wound around said cylindrical portion, and means on the body for securing a portion of each leader remote from its respective fishhook.

9. The receptacle of claim 8 in which there are provided a plurality of circumferentially spaced inclined ribs joining said first side of the flange to the cylindrical portion and cooperating therewith to define pockets into which the fishhook points may project.

10. The receptacle of claim 8 in which an elastomeric ring is mounted on the cylindrical portion adjacent said first side of the flange, so that the points of the fishhooks may be imbedded into the elastomeric ring.

11. The receptacle of claim 8 in which a second flange is provided on the cylindrical portion and spaced from said first side of the first said flange to define a groove for reception of the fishhook points.

References Cited

UNITED STATES PATENTS 2,917,862 12/1959 McCarthy _____ 43—57.5 X
3,039,226 6/1962 Bagdonas _____ 43—57.5

FOREIGN PATENTS 494,344 7/1953 Canada.

WARNER H. CAMP, Primary Examiner